US007826805B2

(12) United States Patent
Masuda et al.

(10) Patent No.: US 7,826,805 B2
(45) Date of Patent: Nov. 2, 2010

(54) AUTOMATIC-SWITCHING WIRELESS COMMUNICATION DEVICE

(75) Inventors: Masahisa Masuda, Beaverton, OR (US); Yasuhiro Kume, Tokyo (JP)

(73) Assignee: Matech, Inc., Lake Oswego, OR (US)

( * ) Notice: Subject to any disclaimer, the term of this patent is extended or adjusted under 35 U.S.C. 154(b) by 644 days.

(21) Appl. No.: 10/595,758

(22) PCT Filed: Nov. 10, 2004

(86) PCT No.: PCT/US2004/037406

§ 371 (c)(1),
(2), (4) Date: May 9, 2006

(87) PCT Pub. No.: WO2005/048574

PCT Pub. Date: May 26, 2005

(65) Prior Publication Data

US 2008/0274764 A1    Nov. 6, 2008

Related U.S. Application Data

(60) Provisional application No. 60/519,422, filed on Nov. 11, 2003.

(51) Int. Cl.
*H04B 1/38* (2006.01)
(52) U.S. Cl. .......................... 455/90.2; 455/91; 455/92; 455/95; 455/420; 455/419
(58) Field of Classification Search ................ 455/90.2, 455/91, 92, 95, 420, 419
See application file for complete search history.

(56) References Cited

U.S. PATENT DOCUMENTS 1,224,331 A    5/1917    Smith (Continued)

FOREIGN PATENT DOCUMENTS

EP    1213847 A    6/2002

(Continued)

OTHER PUBLICATIONS

Anderson, Hagood; "Simultaneous Piezoelectric Sensing/Actuation . . . "; J Sound Vib.; Jul. 28, 1994; Academic Press Ltd., London, Engl., vol. 174, No. 5; p. 617-639.

(Continued)

*Primary Examiner*—Daniell L Negrón
*Assistant Examiner*—Huy D Nguyen
(74) *Attorney, Agent, or Firm*—Stolowitz Ford Cowger LLP

(57) ABSTRACT

A base unit and a handset comprise a wireless part, a control part, and a transmission (151) and reception part (150), respectively. Communications are switched by either of the two ways: PTT switching and tone generation in the base unit, and tone detection in the handset or PTT switching in the base unit, and voice detection in the handset. It is preferable that the transmission (151) and reception (150) part of the handset includes a single transducer type headphone. It is also preferable that photo-coupler (41, 43) and a photo-switch (42) are provided at connection point of signal paths between the transmission (151) and reception part (150), the control part, and between the control part and the wireless part.

16 Claims, 12 Drawing Sheets

U.S. PATENT DOCUMENTS

| | | | |
|---|---|---|---|
| 3,114,105 A | | 12/1963 | Neumiller |
| 3,370,236 A | | 2/1968 | Walker |
| 3,781,492 A | | 12/1973 | Cragg et al. |
| 3,829,624 A | | 8/1974 | Goodin et al. |
| 3,955,140 A | * | 5/1976 | Stephens et al. ............ 455/11.1 |
| 4,002,860 A | | 1/1977 | Terai et al. |
| 4,052,562 A | | 10/1977 | Anderson |
| 4,065,646 A | | 12/1977 | Schuh |
| 4,082,919 A | | 4/1978 | Day et al. |
| 4,087,636 A | | 5/1978 | Akiyama et al. |
| 4,156,800 A | | 5/1979 | Sear |
| 4,280,018 A | | 7/1981 | Lazarus et al. |
| 4,403,120 A | | 9/1983 | Yoshimi |
| 4,470,127 A | * | 9/1984 | Thompson .................... 714/18 |
| 4,516,200 A | * | 5/1985 | Thompson .................. 709/217 |
| 4,519,029 A | * | 5/1985 | Thompson .................. 709/227 |
| 4,598,396 A | | 7/1986 | Upp et al. |
| 4,629,829 A | | 12/1986 | Puhl et al. |
| 4,635,285 A | * | 1/1987 | Coombes .................... 455/403 |
| 4,644,330 A | | 2/1987 | Dowling |
| 4,668,842 A | | 5/1987 | Yokoyama et al. |
| 4,691,313 A | | 9/1987 | Iwata |
| 4,695,823 A | | 9/1987 | Vernon |
| 4,696,045 A | | 9/1987 | Rosenthal |
| 4,741,018 A | | 4/1988 | Potraz et al. |
| 4,833,719 A | | 5/1989 | Carme et al. |
| 4,837,829 A | | 6/1989 | Lobb |
| 4,912,758 A | | 3/1990 | Arbel |
| 4,941,123 A | * | 7/1990 | Thompson .................. 709/217 |
| 4,972,491 A | | 11/1990 | Wilcox |
| 5,007,046 A | | 4/1991 | Erving et al. |
| 5,099,519 A | | 3/1992 | Guan |
| 5,115,471 A | | 5/1992 | Liden |
| 5,118,309 A | | 6/1992 | Ford |
| 5,168,522 A | | 12/1992 | Simanis et al. |
| 5,172,410 A | | 12/1992 | Chace |
| 5,202,918 A | | 4/1993 | White |
| 5,235,637 A | | 8/1993 | Kraz et al. |
| 5,265,264 A | | 11/1993 | Dzunt et al. |
| 5,287,406 A | | 2/1994 | Kakuishi |
| 5,307,405 A | | 4/1994 | Sih |
| 5,311,144 A | | 5/1994 | Grasset |
| 5,333,205 A | | 7/1994 | Bogut et al. |
| 5,335,286 A | | 8/1994 | Carlson et al. |
| 5,379,450 A | | 1/1995 | Hirasawa et al. |
| 5,393,989 A | | 2/1995 | Gempe et al. |
| 5,410,595 A | | 4/1995 | Park et al. |
| 5,420,930 A | * | 5/1995 | Shugart, III .................. 381/315 |
| 5,465,298 A | | 11/1995 | Wilkison et al. |
| 5,471,666 A | | 11/1995 | Sugiyama et al. |
| 5,479,474 A | * | 12/1995 | Schwartzman et al. ....... 455/570 |
| 5,586,193 A | | 12/1996 | Ichise et al. |
| 5,692,059 A | | 11/1997 | Kruger |
| 5,708,970 A | * | 1/1998 | Newman et al. ............ 455/701 |
| 5,715,309 A | | 2/1998 | Bartkowiak |
| 5,824,966 A | | 10/1998 | Leight |
| 5,899,973 A | | 5/1999 | Bandara et al. |
| 5,907,538 A | | 5/1999 | White |
| 6,104,824 A | | 8/2000 | Ito |
| 6,105,714 A | | 8/2000 | Lindgren |
| 6,138,790 A | | 10/2000 | Leight |
| 6,175,633 B1 | | 1/2001 | Morrill et al. |
| 6,311,052 B1 | * | 10/2001 | Lenz .......................... 455/305 |
| 6,357,292 B1 | | 3/2002 | Schultz et al. |
| 6,415,034 B1 | | 7/2002 | Hietanen |
| 6,480,610 B1 | | 11/2002 | Fang et al. |
| 6,795,549 B2 | * | 9/2004 | Ferianz et al. ......... 379/390.03 |
| 2003/0134600 A1 | * | 7/2003 | Picone et al. ................. 455/68 |
| 2003/0185403 A1 | | 10/2003 | Sibbald |
| 2004/0072540 A1 | * | 4/2004 | Wilson et al. .............. 455/41.2 |
| 2004/0213427 A1 | * | 10/2004 | Yoon .......................... 381/370 |
| 2007/0133442 A1 | | 6/2007 | Masuda |

FOREIGN PATENT DOCUMENTS

| | | |
|---|---|---|
| EP | 0719018 B | 11/2002 |
| FR | 2755561 | 5/1998 |
| JP | 0032833 | 4/1981 |
| JP | 2001060895 | 8/1999 |
| JP | 2001060895 | 3/2001 |
| RU | 2109408 | 4/1998 |
| WO | WO 97/27721 | 7/1997 |
| WO | WO 98/45937 | 10/1998 |

OTHER PUBLICATIONS

Sedra et al., "Microelectronic Circuits," Jul. 1990, second edition, p. 143.
Frank Kasparec, St. Poelten, Austria, Bilateral Speaker Networks Form Switchless Intercom, Electronics, vol. 53 p. 131, Jul. 3, 1980.
D5004 Cellular Telephone Echo Control Device, DSP Group, Inc. Jan. 1991, Rev. 2.0.
Telephone Coupling Transformer, Mouser Electronics, Feb. 16, 1995.
International Search Report for PCT/US97/22887; Date of mailing Jan. 4, 1999; ISA/US.
International Search Report for PCT/US01/22121; Date of mailing Nov. 11, 2002; ISA/EPO.
International Preliminary Examination Report for PCT/US01/22121; Date of completion of report Jun. 6, 2003.
International Search Report for PCT/US97/22887; Date of mailing Jan. 4, 1999; ISA/US.
International Search Report for PCT/US02/33799; Date of mailing Jan. 24, 2003; ISA/EPO.
International Search Report for PCT/US04/37409; Date of mailing Aug. 29, 2005; ISA/US.
International Preliminary Report on Patentability for PCT/US04/37409; Date of completion of report May 11, 2006; IPEA/US.
Written Opinion of the International Searching Authority for PCT/US04/37409; Date of mailing Aug. 29, 2005; ISA/US.
Stolowitz Ford Cowger Listing of Related Cases, Sep. 2, 2009.
International Search Report for PCT/US09/38126; Date of mailing Jul. 22, 2009; ISA/US.
Written Opinion of the International Searching Authority for PCT/US09/38126; Date of mailing Jul. 22, 2009; ISA/US.

* cited by examiner

AUTOMATIC-SWITCHING WIRELESS COMMUNICATION DEVICE

BACKGROUND OF THE INVENTION

1. Technical Field of the Invention

This disclosure relates to a two-way wireless communication device, and more particularly, to a wireless communication device such as a transceiver that is capable of automatically switching between transmission and reception modes in a handset.

2. Description of the Related Art

In cases where a user wishes to transmit his voice using a conventional wireless communication device such as a transceiver, the user manually activates a push-to-talk switch (hereafter, a 'PTTSW') to transition from stand-by (reception) mode to transmission mode. The user may then transmit his voice to his counterpart.

After the user informs his counterpart that he is finished transmitting (often indicated by voicing phrases such as "please", "please respond", or "over"), he releases the PTTSW to switch from transmission mode to reception mode in order to hear the voice of his communication partner. Since communications are made to each other using a single radio frequency carrier wave, this communication system is commonly known as a "half-duplex" type of system.

Other conventional wireless communication methods are such that a user's transmission and reception frequencies are different, and each is used as his counterpart's reception and transmission frequency, respectively. Thus the party can speak and hear freely, just like using a regular telephone. This system is commonly categorized as "full duplex."

In the simplest case of a conventional full-duplex wireless communication device, both the base unit and the handset transmit and receive radio waves with all of the power sources (including those for the transmission part and the reception part) are kept turned on both during stand-by and actual communication. Because the transmission part usually consumes far more power than the other parts, the power supply for the transmission part imposes a heavy burden on the handset, especially when a small and portable handset is required.

FIG. 1 is a block diagram that illustrates an improved, conventional, "full-duplex" wireless communication device that turns the power source of the transmission part on only when transmission is being performed with the handset and/or the base unit.

Referring to FIG. 1, the device includes a wireless part, a control part, and a transmitter/receiver part, each of which are indicated by dashed lines. A reception antenna 1 in the wireless part picks up a reception signal, which is sent to the reception part 150. The reception part 150 includes a high frequency amplifier 2, a reception mixer 3, an intermediate frequency (IF) amplifier 4, and a FM demodulator 5. After being processed in the reception part 150, the reception signal is transmitted to a receiver 8 in the transmitter/receiver part via switch 6 in the control part. Normally, switch 6 is always turned on.

A transmission signal from a transmitter 11 in the transmitter/receiver part is emitted in the form of radio waves from a transmission antenna 19 in the wireless part. A switch 12 in the control part couples the transmission signal to a transmission part 151 in the wireless part. The transmission part 151 includes a FM demodulator 16, a transmission mixer 17, and a transmission power amplifier 18.

The control part is further equipped with a PTTSW 9 by which manual input is given to a transmission/reception switch controller 10. The switch controller 10 controls the switches 6 and 12 and a transmission part power source 20.

When the PTTSW 9 is not manually activated, the wireless communication device emits no radio waves and is set in reception mode where the switch 12 and the transmission part power source 20 are turned off.

To initiate communications, the PTTSW 9 is pushed down, activating both the switch 12 and the transmission part power source 20. A person at the other end is called, who must then depress his own PTTSW to answer the call. During communication, both PTTSWs should be turned on. When communication is over, each user turns off their PTTSW.

According to this wireless communication device, total power consumption is reduced because the power in the transmission part is consumed only when the PTTSW 9 is pushed down ("On" condition).

The details regarding the control part in FIG. 1 during each mode of operation are described below. The base unit and the handset have the same structure, and are operated in the same manner, exchanging different transmission and reception frequencies.

In stand-by mode (no radio wave is emitted): PTTSW 9 is off (open circuit); switch 6 is on, connecting receiver 8 to FM demodulator 5; switch 12 is off, placing transmitter 11 in an open circuit; and transmission part power source 20 is turned off.

In communication mode (radio wave is emitted): PTTSW 9 is on; switch 6 is on; switch 12 is on, connecting transmitter 11 to FM modulator 16; and transmission part power source 20 is turned on.

FIG. 9 is a block diagram illustrating a conventional "half-duplex" wireless communication device. When compared with the "full-duplex" device of FIG. 1, the half-duplex device differs from FIG. 1 in that the transmission and reception signals are each transmitted/received from a common transmission-reception antenna 22 via a switch 21. Further, the transmission/reception switch controller 10 controls the switch 6 and the switch 21 as well as the switch 12 and the transmission part power source 20.

The wireless communication device emits no radio wave when the PTTSW 9 is not manually pushed down. In this reception mode the switch 21 is connected to the reception part 150 and the switch 6 is turned on, while the switch 12 and the transmission part power source 20 are turned off.

To start communication, the PTTSW 9 is pushed down for transmission mode. The switch 21 connects to transmission part 151 and the switch 6 is turned off, while the switch 12 and the transmission part power source 20 are turned on. Communication is then started with words such as "hello", so that the person at the other end is called. Response from the counterpart is promoted with words such as "please" at the time of completion of transmission, then the PTTSW 9 is turned off returning the device back to reception mode.

When the counterpart receives words such as "please", which is a sign of completion of transmission, he/she pushes down his/her PTTSW 9 changing the counterpart device to transmission mode. The counterpart device then starts a reply transmission. At the end of his/her reply, a sign of completion of communication such as "please" is transmitted. The PTTSW 9 in the counterpart device is turned off returning the device back to the reception mode. In this manner, communication is conducted between the two wireless communication devices.

The control part in FIG. 9 operates as follows. The base unit and the handset have the same structure, and act in the same manner with the same transmission and reception frequency. In the stand-by mode PTTSW 9 is off, switch 6 is connected to receiver 8, switch 12 is disconnected to transmitter 11, switch 21 is connected to reception part 150 (to High frequency amplifier 2). In the transmission part 151 the transmission part power source 20 is off and no radio wave is emitted.

In the transmission mode, the PTTSW 9 is turned on disconnecting switch 6 from receiver 8, connecting switch 12 to transmitter 11, and switching switch 21 to transmission part 151 (transmission power amplifier 18). In transmission part 151, the transmission part power source 20 is turned on and a radio wave is emitted.

In the reception mode the PTTSW 9 is turned off connecting switch 6 to receiver 8, disconnecting switch 12 from transmitter 11, and switching switch 21 to reception part 150 (High frequency amplifier 2). In the transmission part 151, the transmission part power source 20 is turned off and no radio wave is emitted.

As is described above, the difference between the full-duplex and the half-duplex systems is summarized as follows. In the full-duplex system, similar to a telephone system, both users may simultaneously transmit and receive signals. In the half-duplex system, one user cannot break into the other's speech so long as the other is talking. Therefore, the PTTSW is indispensable in the half-duplex system for switching communications between the two users.

The conventional wireless communication device such as a transceiver is widely used as a handy, communication-switchable, wireless device. However, communications cannot be made without manually pushing the PTT switch. This makes it impossible to communicate when the user's hands are not free to push the PTT switch. Examples of such situations include communications between a racing car driver and his/her pit crew and communications between a firefighter and his/her fire crew.

As is described above, if the full-duplex system without the PPT switch 9 is used, both hands may be freely used (hands-free), but the power source 20 of the transmission part remains turned on increasing consumption of the power source (battery). Therefore, the system cannot be continuously operated for a long time period.

A headphone may be used for containing the transmitter/receiver part of the handset in order leave the user's hands free. However, the microphone in the headphone type handset often picks up noise and voice around the user, deteriorating voice quality.

To reduce this problem, the microphone can be located in an earphone that is inserted into a user's external ear canal, while the other ear canal is occupied by a speaker earphone. However, in this case, both ears are occupied with the microphone and the speaker. This prevents the headset operator from hearing other peripheral sounds and voices, which often causes crucial inconvenience.

SUMMARY OF THE INVENTION

A hands free handset consumes minimum of power at the wireless transmission part of a full-duplex or half-duplex wireless communication device. In one embodiment, the handset uses a single-transducer that transmits the user's voice while filtering out external noise. At the same time the user's ears are free to hear the external sounds and voices. Voice-operated control improves sound quality by avoiding interference between a wireless part and a control part, or between the control part and a transmitter/receiver part.

BRIEF DESCRIPTION OF THE DRAWINGS

The foregoing features of this invention as well as the invention itself may be more fully understood from the detailed description of the following drawings.

Figure 1:
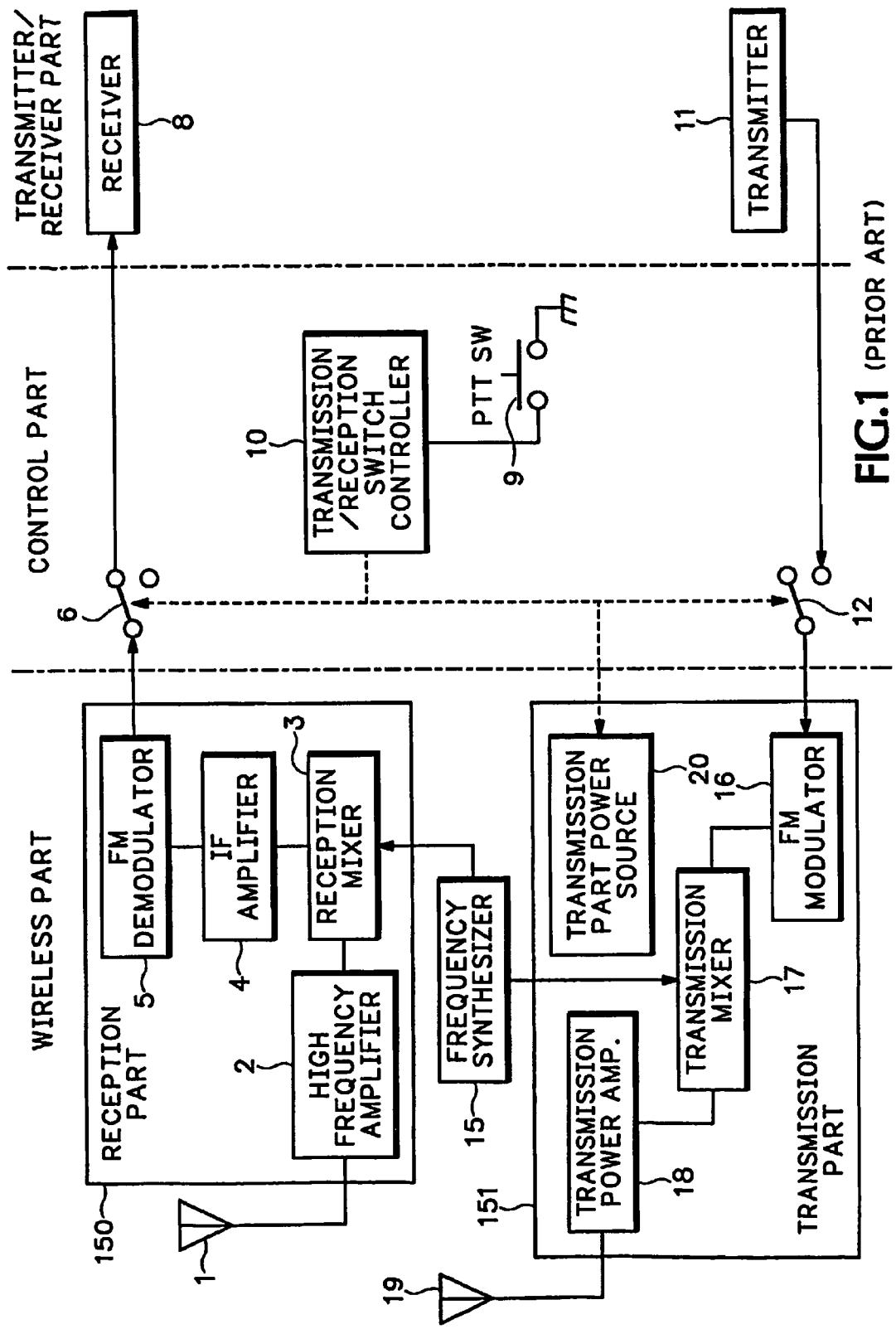
FIG. 1 is a block diagram illustrating a base unit and a handset for a conventional full-duplex, automatic-switching, wireless communication device.

DEFINITIONS 1 reception antenna
2 high frequency amplifier
3 reception mixer
4 IF amplifier
5 FM demodulator
6, 12, 21, 25 switches
8 receiver
9 PTT switch (PTTSW)
10 transmission/reception switch controller
11 transmitter
15 frequency synthesizer
16 FM modulator
17 transmission mixer
18 transmission power amplifier
19 transmission antenna
20 transmission part power source
22 transmission and reception antenna
24 tone generator
30 tone detector
35 voice detector
41, 43 photo-couplers
42 photo-switch
51, 53 amplifiers 52 microphone-and-speaker ST headphone
150 reception part
151 transmission part

DETAILED DESCRIPTION OF THE INVENTION

Preferred embodiments of the present invention will be described in details with reference to accompanying drawings as follows.

Figure 2:
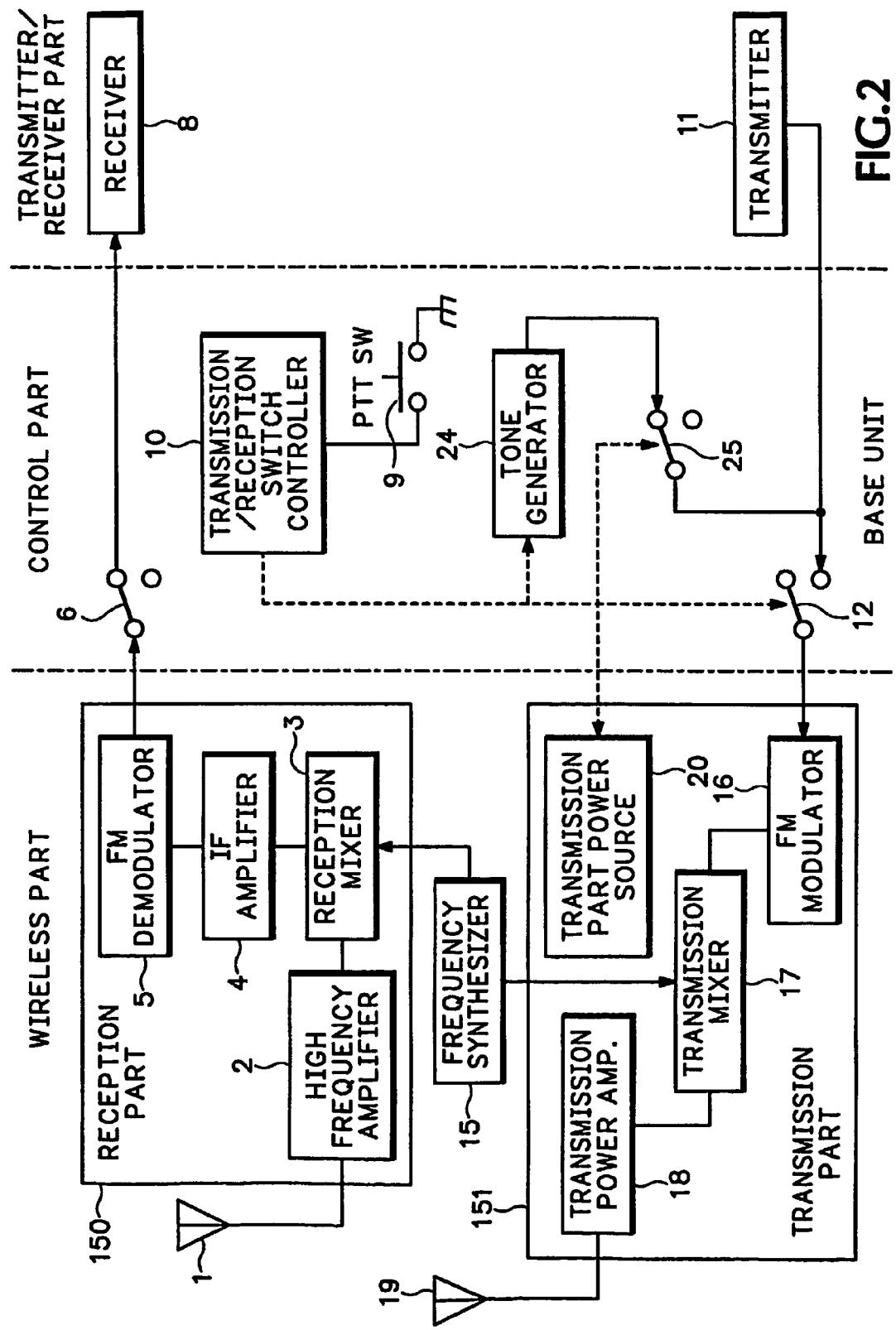
FIG. 2 shows one embodiment for a base unit of a full-duplex, automatic-switching wireless communication device.
Figure 3:
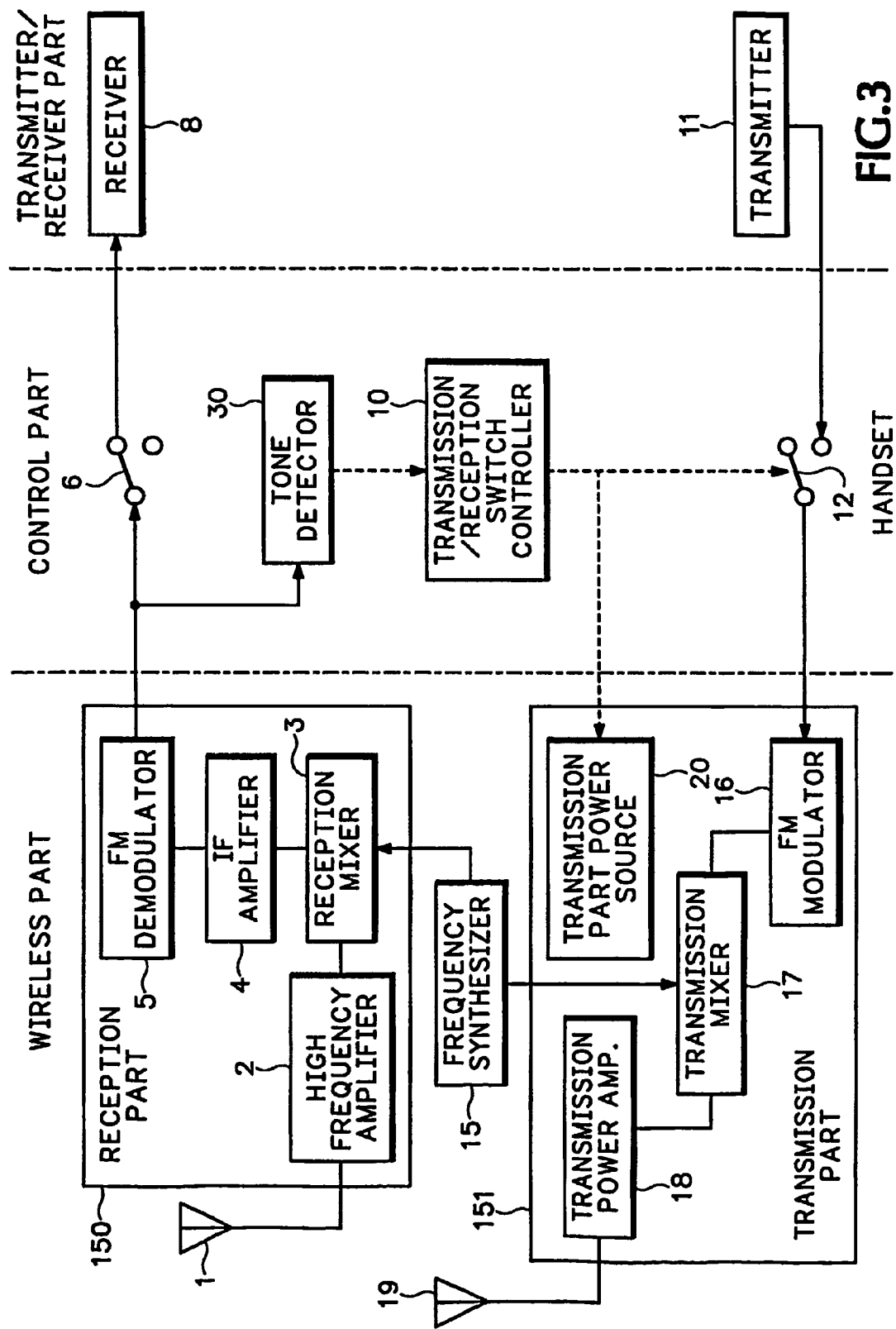
FIG. 3 shows an embodiment of a handset of a full-duplex, automatic-switching wireless communication device.

FIGS. 2 and 3 are circuit block diagrams of a base unit and a handset, respectively, for a full-duplex, automatic-switching wireless communication device. When using the full-duplex wireless communication device, it is assumed that the user with the handset in FIG. 3 does not have their hands free for operation of the device. It is assumed that the user of the base unit in FIG. 2 can operate the device using their hands similar to a conventional transceiver. In this case, the person with the base unit in FIG. 2 has the initiative to start a transmission.

In this embodiment, both of the base unit (FIG. 2) and the handset (FIG. 3) comprise a wireless part, a control part, and a transmitter/receiver part. Explanations will be omitted for the portions where their structures and actions are the same as those of the above-mentioned, prior art, full-duplex wireless communication device.

Referring to FIG. 2, the control part of the base unit is driven by manually turning on/off the PTTSW 9. The transmission/reception switching controller 10 controls a tone generator 24 and a switch 25. The controller 10 also controls the switch 12 on the transmission path and the transmission part power source 20 in the transmission part 151.

Figure 4:
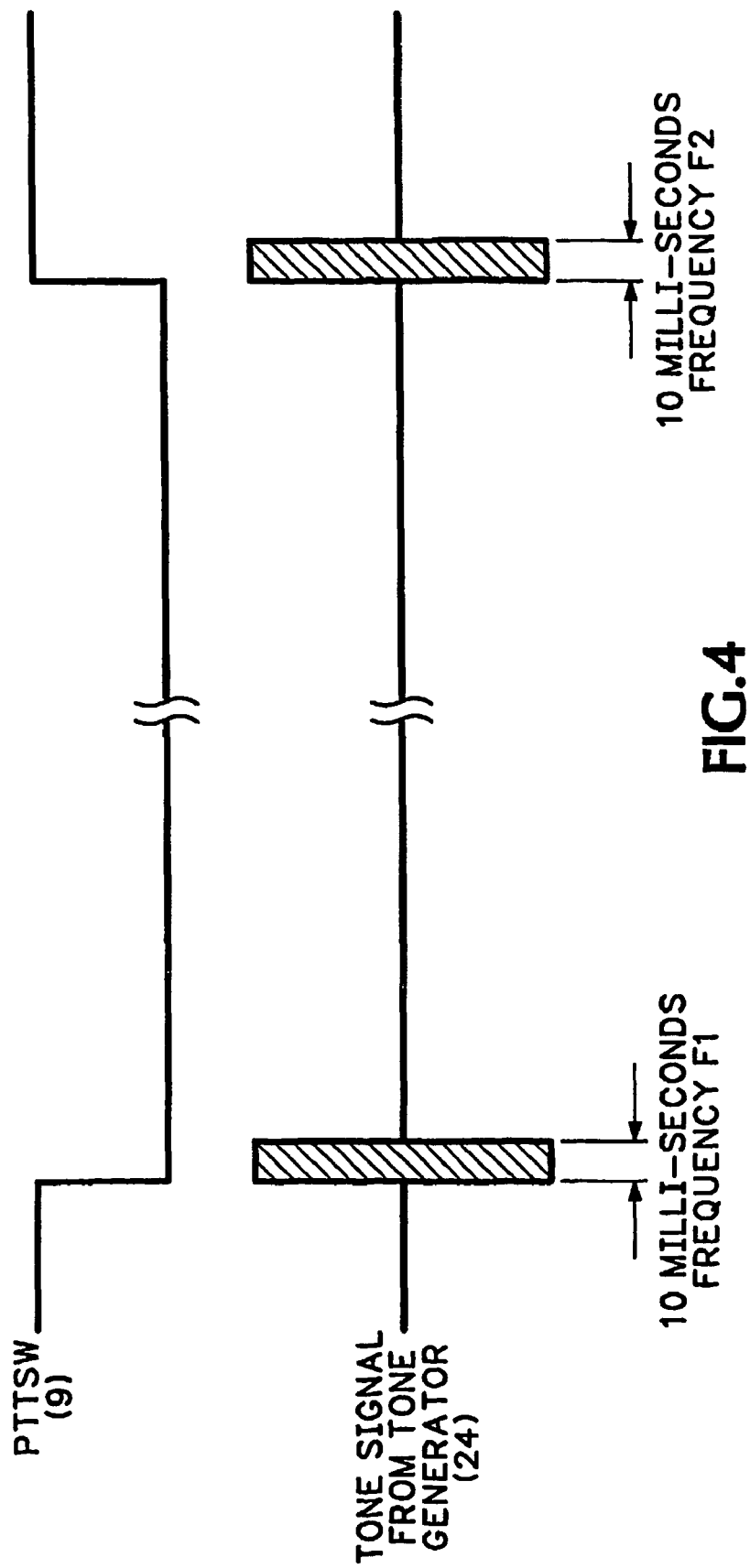
FIG. 4 shows timing for generating tone signals in a full-duplex, automatic-switching wireless communication device.

Referring to FIG. 4, when the PTTSW 9 in FIG. 2 is turned on or off, a tone signal "ON" with frequency F1 (for example, 1000 Hz) or "OFF" with F2 (for example, 1200 Hz), respectively, is generated by the tone generator 24, for 10 milliseconds. These tone signals are then transmitted to the transmission path of the base unit via the switch 25.

Referring to FIG. 3, the control part of the handset includes a tone detector 30 connected to the reception path. The tone detector 30 detects either tone signal "ON" or "OFF". The control part also includes a transmission/reception switch controller 10 that receives a signal from the tone detector 30 and controls the switch 12 on the transmission path and the transmission part power source 20.

A microcomputer and a display unit (not shown) are also provided in the control part of the base unit in FIG. 2 and in the control part of the handset in FIG. 3. The microcomputer controls the wireless part, the control part, and the transmitter/receiver part with various control signals including those shown by broken lines, while the display part illustrates conditions of the device to a user.

In FIG. 2, when the base unit user pushes and turns on the PPTSW 9, the base unit itself is switched to a communication mode and transmits the tone signal "ON" generated from the tone generator 24. The PPTSW 9 may be part of a push button telephone system that sends the tone signal "ON" to the handset in FIG. 3 for a short time (10 milliseconds). The handset in FIG. 3 switches to a communication mode when the tone signal "ON" is detected.

When the base unit user in FIG. 2 turns off the PTTSW 9, the base unit transmits tone signal "OFF", with a frequency different from that of tone signal "ON", to the handset also for a short time (e.g., 10 milliseconds). The base unit is then switched to stand-by mode. The handset in FIG. 3 is also switched to stand-by mode when the tone signal "OFF" is detected. Because a user does not need to manually handle a PPT switch in order to operate the handset in FIG. 3, hands-free communication becomes feasible. Power savings are also provided since the transmission part power source 20 can be controlled in such a manner that it is turned on only in the transmission mode. Actions of this embodiment will be described in details per mode of operation.

In the base unit stand-by mode the PPTSW 9 is off. The switch 6 is connected to the receiver 8 and the switch 12 is disconnected from the transmitter 11. The tone generator 24 transmits the tone "OFF" for 10 milliseconds after PPTSW 9 is turned off. After the 10 milliseconds, the transmission part power source 20 is turned off and no radio waves are emitted.

In the handset stand-by mode, the tone detector 30 detects the tone "OFF" signal and then instructs the transmitter/receiver switch controller 10 to go into stand-by mode. In the standby mode, the switch 6 is turned on connecting to receiver 8 and the switch 12 is turned off disconnecting from transmitter 11. The transmission part power source 20 is turned off and no radio waves are emitted.

In the base unit communication mode the PPTSW 9 is turned on. This causes the switch 6 to connect to receiver 8 and switch 12 to connect to transmitter 11. The transmission part power source 20 is turned on and radio waves are emitted. The tone generator 24 is turned on transmitting the tone "ON" for 10 milliseconds after PPTSW 9 is turned on.

In the handset communication mode the tone detector 30 detects the tone "ON" signal received from the base unit. The handset generates a "communication mode" signal to the transmitter/receiver switch controller 10. The controller 10 then causes the switch 6 to connect to receiver 8 and switch 12 connects to transmitter 11. The transmission part power source 20 is turned on and radio waves are emitted.

Figure 5:
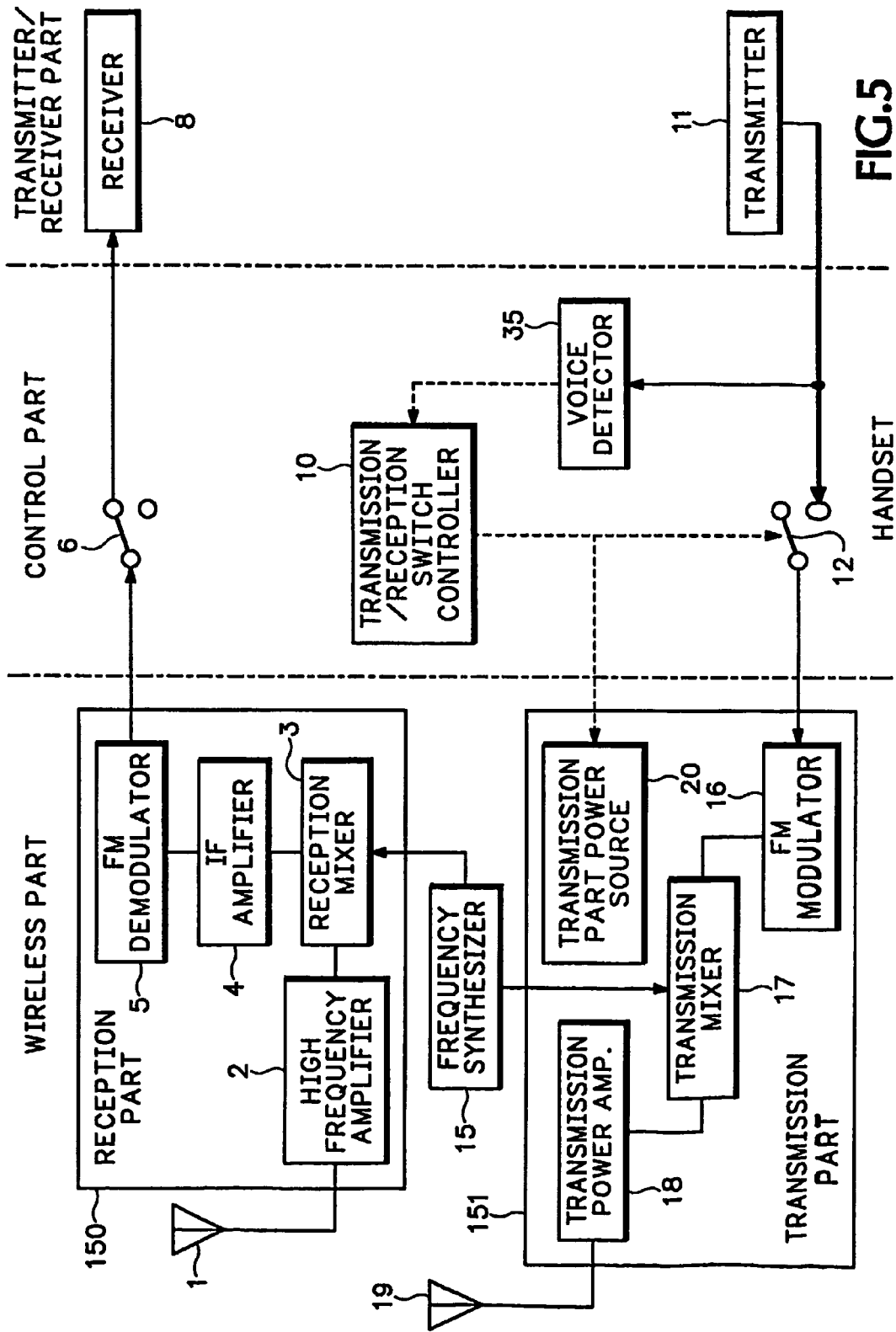
FIG. 5 shows another embodiment of a handset of a full-duplex, automatic-switching wireless communication device.

FIG. 5 is a circuit block diagram of a handset, showing a full-duplex, automatic-switching wireless communication device in a second embodiment according to the present invention. The base unit can be similar to the prior art base unit shown in FIG. 1.

When using the full-duplex wireless communication device per this embodiment, it is assumed that the user with the handset does not have their hands available for operating the handset. It is further assumed that the user of the base unit can operate the device using freely his/her hands (like for conventional transceiver). In this case, however, the person with the handset can initiate the call.

Referring to FIG. 5, the handset comprises a wireless part, a control part, and a transmitter/receiver part. Explanations will be omitted for the portions where their structures and actions are the same as those of described above.

In the control part of the handset, the transmission/reception switch controller 10 controls the switch 12 on the transmission path and the transmission part power source 20 such that both of them are turned on when a voice detector 35 detects voice signals at the output of the transmitter 11. Both the switch 12 and power source 20 are turned off when voice is not detected at the output of the transmitter 11.

Figure 6:
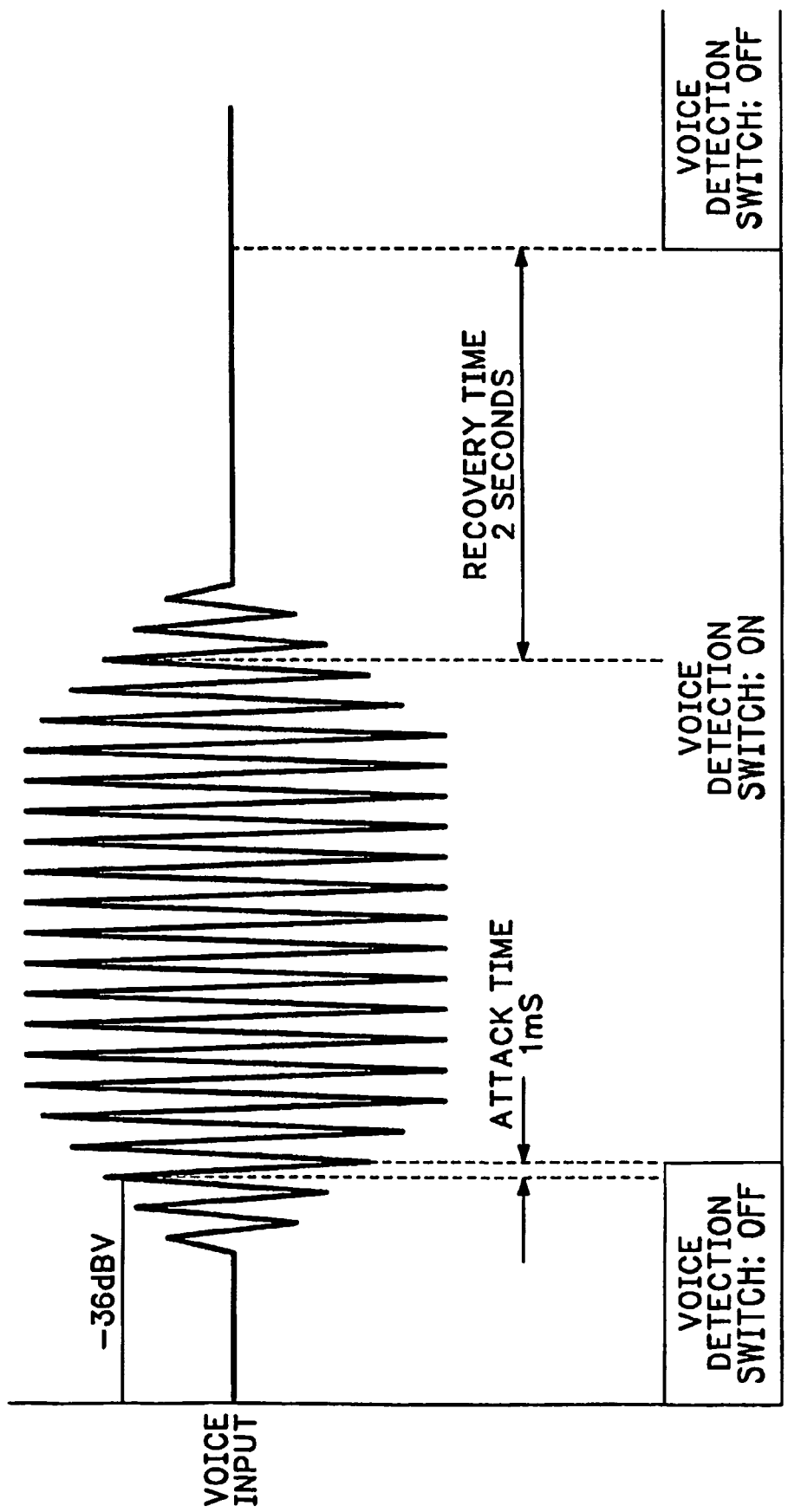
FIG. 6 shows timing for voice detection in a full-duplex, automatic-switching wireless communication device.

Referring to FIG. 6, the voice detector 35 in FIG. 5 is turned on when the voice input level exceeds a predetermined value, for example, −36 dBV for one millisecond ("attack time"). The voice detector 35 is turned off when the voice input level is below a predetermined value, for example, below −36 dBV for two seconds ("recovery time").

The handset user starts and continues to transmit voice when and while he/she wants to transmit. The base unit user decides its own mode by the PTTSW as is similar in the prior art. Thus, the handset user in FIG. 5 only needs to talk in order to enable the communication mode. This prevents the user from having to manually operate a PTT switch or the like. In addition, the transmission part power source 20 is controlled in a manner whereby it is only turned on while the handset produces voice signals saving handset power.

The following describes the operation of the handset in FIG. 5 in more detail. In the base unit stand-by mode the PPTSW 9 is off. This causes switch 6 in the base unit to be on and connected to receiver 8 while switch 12 is disconnected from transmitter 11. Transmission part power source 20 is turned off and no radio waves are emitted.

In the handset stand-by mode, the voice detector 35 in FIG. 5 detects no voice signal and sends a stand-by signal to the transmitter/receiver switch controller 10. The controller 10 causes switch 6 to be connected to receiver 8 and causes switch 12 to be disconnected from transmitter 11. The transmission part power source 20 is turned off and no radio waves are emitted.

The base unit, for example in FIG. 1, is in a communication mode when the PPTSW 9 is pushed on. This causes switch 6 to connect to receiver 8 and switch 12 to connect to transmitter 11. Transmission part power source 20 is turned on and radio waves are emitted. The handset in FIG. 5 is in the communication mode when the voice detector 35 detects voice signals. The voice detector 35 then generates a communication signal to the transmitter/receiver switch controller 10. The controller 10 causes the switch 6 to connect to the receiver 8 and the switch 12 to connect to transmitter 11. The transmission part power source 20 is turned on and radio waves are emitted.

If the above mentioned embodiments are combined, a full-duplex, automatic-switching wireless communication device can be obtained. That is to say, the base unit in FIG. 2 can generate the tone signals, while, the handset has a combined transmission/reception switching function driven both by tone detection (shown in FIG. 3) and by voice detection from a local user speaking into transmitter 11 (shown in FIG. 5). The transmission part power source 20 is controlled to be turned on only when the voice detector 35 detects voice at the output of the transmitter 11.

Thus, communication is feasible, if either one of the base unit and the handset users wants to initiate the call. That is, an ideal full-duplex communication can be made feasible in which the handset can be used hands-free, while consumption of power is limited to a minimal time when the handset actually generates necessary voice.

Figure 7:
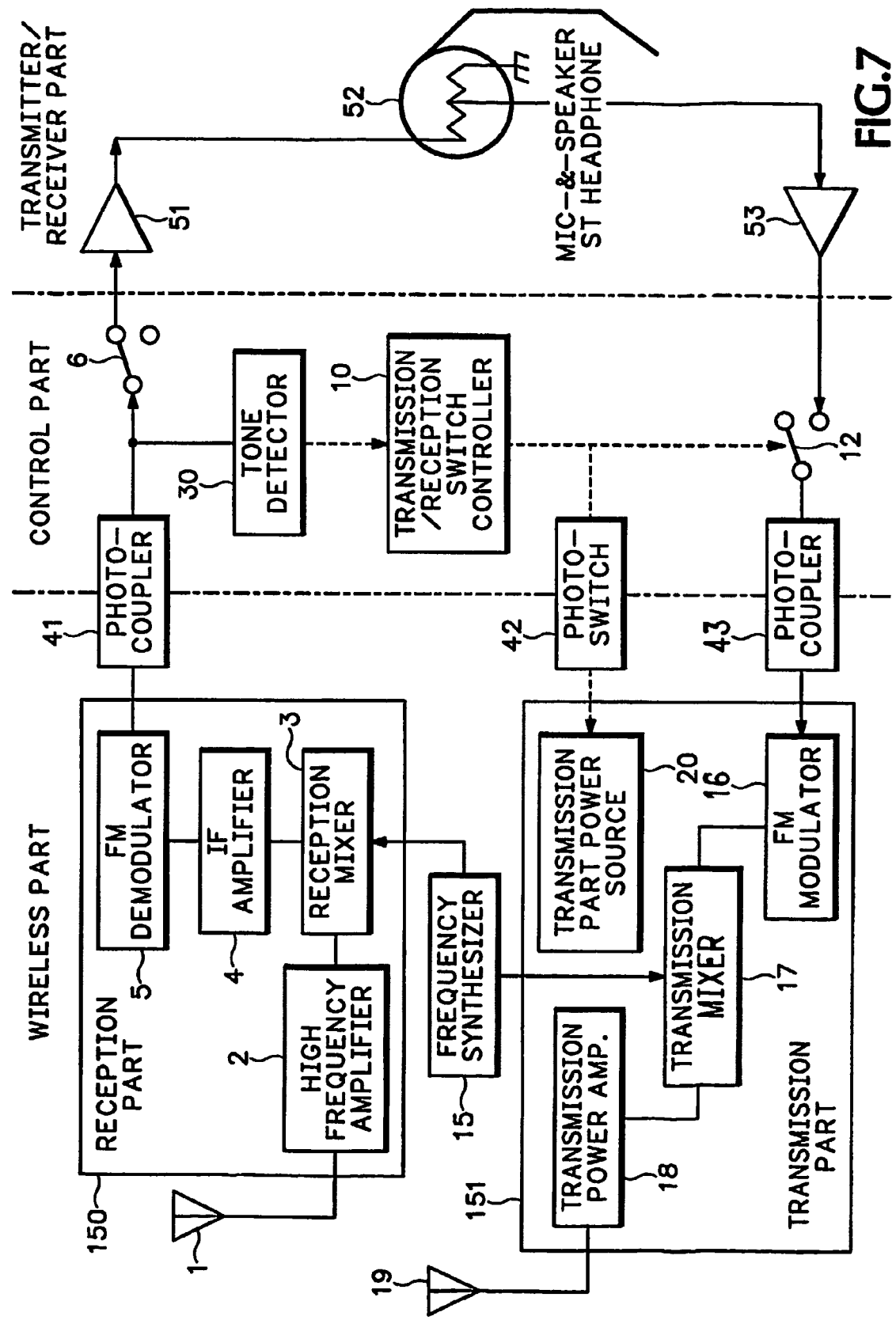
FIG. 7 shows another embodiment of a handset of a full-duplex, automatic-switching wireless communication device.

FIG. 7 is a circuit block diagram of the handset, showing a full-duplex, automatic-switching wireless communication device according to another embodiment of the invention. In this case, the base unit shown in FIG. 2 is used as one example.

One difference between the handsets per this embodiment and other handsets described above is that a microphone-and-speaker headphone 52 is introduced to a transmitter/receiver part. The transmitter and a receiver are a microphone and a speaker integrated into a single-transducer (ST) type microphone-and-speaker ST headphone. The ST is commonly used both for transmission and reception. Amplifiers 51, 53 are provided in order to interface the ST 52 with the outside (the control part and the wireless part).

The transmitter/receiver part, at least the portion thereof including the ST, is shaped like an earphone, and inserted into one of the user's external ear canals. Received voice is transmitted to the eardrum membrane of the user, while, user-generated voice is sensed in the form of vibration of the user's eardrum membrane, then transmitted to the outside as a transmission signal.

According to this system, outside noise is prevented from superposing both on transmitted and received voices so received voice can be clearly heard and transmission voice can be clearly transmitted. Furthermore, the user can keep free both his/her hands and (periphery of) mouth and also his/her other ear, he/she can use both hands and mouth for other jobs, and can hear peripheral sound and voice using the other ear that does not contain the earphone.

Photo-couplers 41, 43 are provided in the reception path and in the transmission path. A photo-switch 42 is provided in the control signal path for the transmission part power source 20 at the connection point of the control part and the wireless part.

In general, the transmitter (microphone) of the transmitter/receiver part requires a highly sensitive, high gain amplifier in order to amplify weak signals. A single-transducer type sensor may require a special class of highly sensitive, high gain amplifier with gain of about 55 dB, which may be very sensitive to noise.

The above mentioned photo-couplers and photo-switch shut down noise from the wireless part via its power source, so that the amplifier can be stably actuated. The photo-couplers and photo-switch can be either of an analog type or a digital type. In this embodiment, so long as the tone signal "ON" is not detected, the power source in the transmitter/receiver part of the handset in FIG. 7 can be entirely or partially turned off for saving power.

Figure 8:
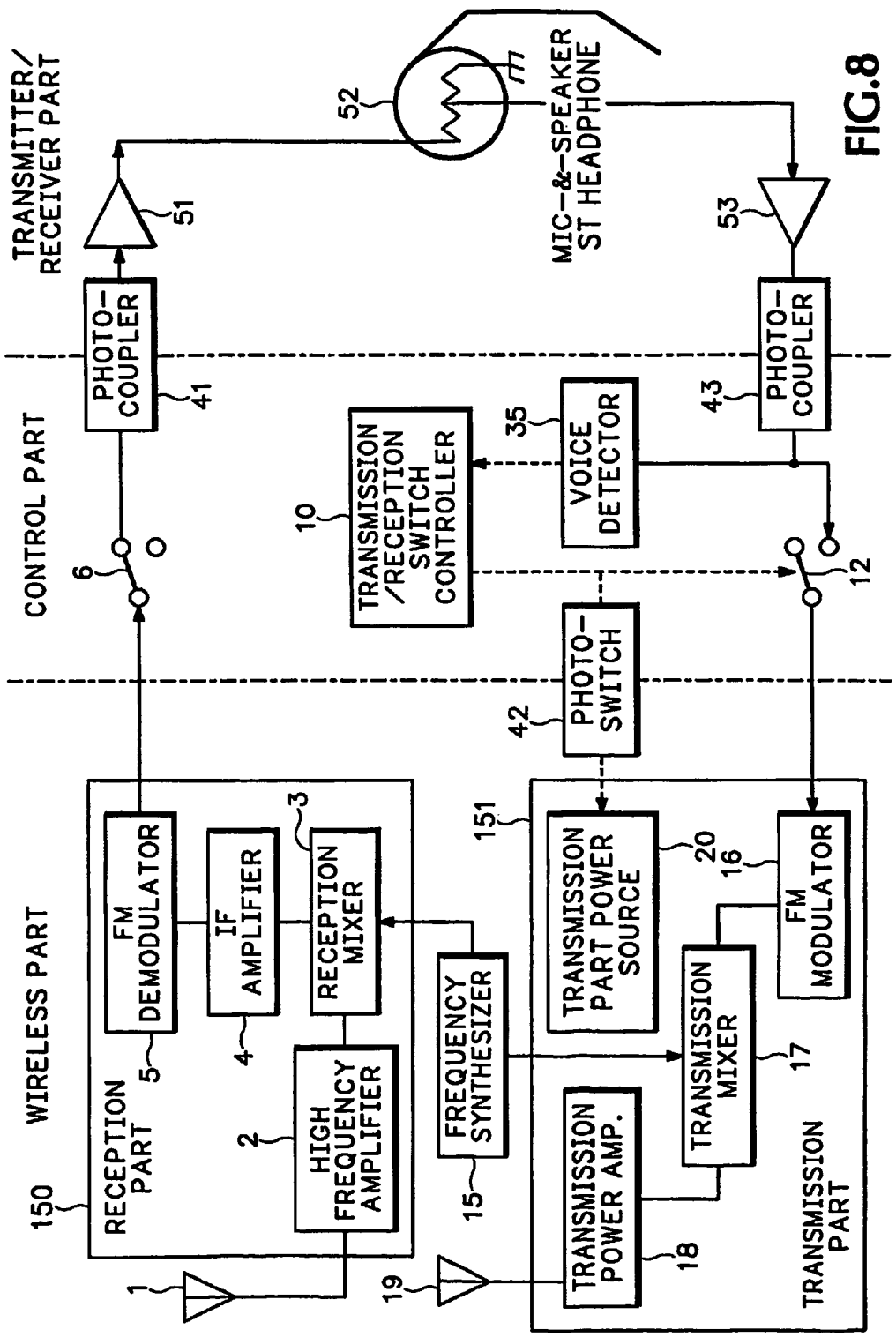
FIG. 8 shows another embodiment of a handset of a full-duplex, automatic-switching wireless communication device.

FIG. 8 is a circuit block diagram of the handset, showing a full-duplex, automatic-switching wireless communication device in another embodiment according to the present invention. In this case, the device in FIG. 1, for example, is used for the base unit.

A first difference in this embodiment is that the photo-couplers 41, 43 are provided at the transmitter/receiver part side of the switches 6, 12. A second difference is that the control part controls transmitter/receiver switching using a voice detector 35.

Not only noise from the wireless part via the power source, but also noise from the control part via the power source can be shut down, so that the highly sensitive high gain amplifier 53 is operated more stably. Noise is reduced in the voice output from a single-transducer type earphone 52 reducing incorrect operation of the voice detector 35. So the additional photo-couplers/photo-switch 41 and 43 work well with the voice detector 35.

Any of the combinations of control parts and the transmitter/receiver parts described above may each have original features, where all combinations described above are included in the scope of the present invention.

Figure 9:
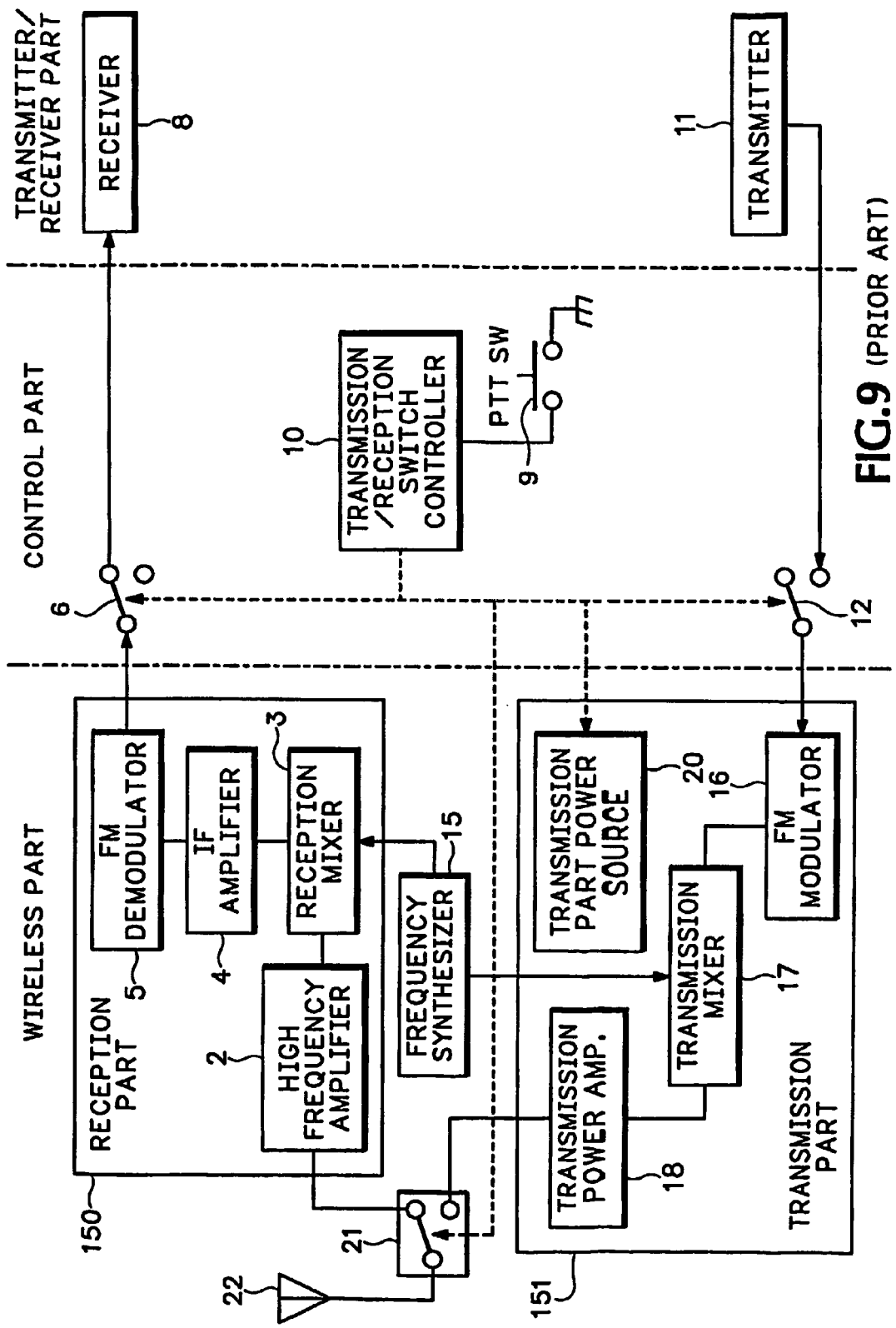
FIG. 9 is a block diagram illustrating a conventional half-duplex wireless communication device.
Figure 10:
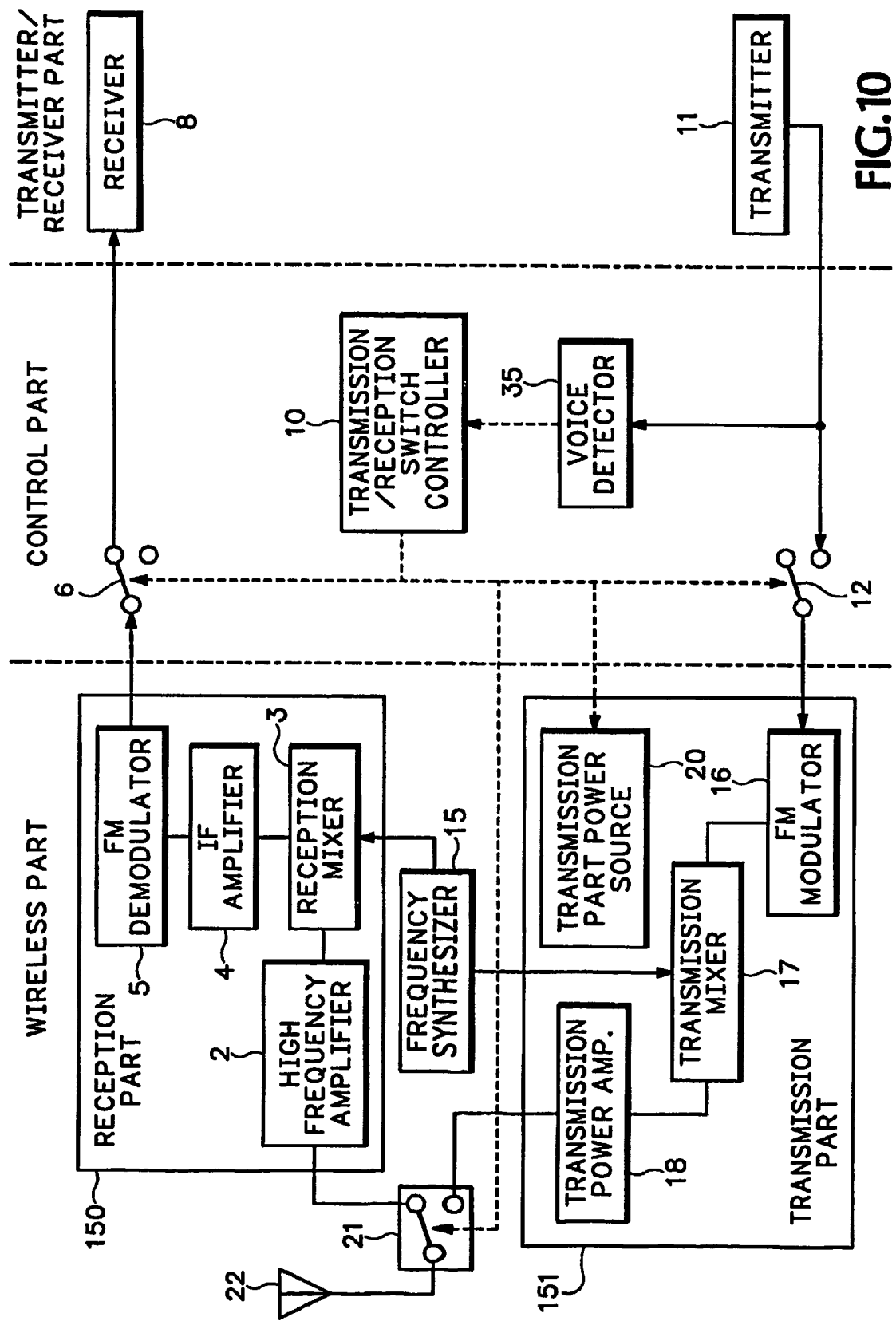
FIG. 10 shows another embodiment of a handset of a half-duplex, automatic-switching wireless communication device.

FIG. 10 is a circuit block diagram of the handset, showing a half-duplex, automatic-switching wireless communication device in another embodiment according to the present invention. In this case, FIG. 9 is used for the base unit according to the prior art.

When using the half-duplex wireless communication device per this embodiment, it is assumed that the user with the handset can not leave either of his/her hands free even momentarily. However, the user with the base unit in FIG. 9 can operate the device freely with his/her hands (like for conventional transceiver). In this case, the person with the handset in FIG. 10 has the initiative for communicating with the person with the base unit.

In this embodiment, the handset (FIG. 10) comprises a wireless part, a control part, and a transmitter/receiver part. Explanations will be omitted for the portions where their structures and actions are the same as those of the above-mentioned half-duplex wireless devices.

In the control part of the handset in FIG. 10, the transmission/reception switch controller 10 controls the switch 12 on the transmission path, the transmission part power source 20, and the switch 21. When a voice detector 35 detects some voice at the output of the transmitter 11, the elements 12 and 20 are turned on and the element 21 is switched to the transmission part 151. When voice is not detected at the output of the transmitter 11, the elements 12 and 20 are turned off and the element 21 is switched to the reception part 150.

Referring to FIG. 6 again, when the voice input level exceeds a predetermined value, for example, −36 dBV for one millisecond ("attack time"), the voice detector switch 35 is turned on. When the voice input level is below a predetermined value, for example, −36 dBV for two seconds ("recovery time"), the voice detector switch 35 is turned off.

Accordingly, the handset user starts and continues to transmit any voice when and while he/she is talking, provided that the base unit is in stand-by (reception) mode. The base unit user decides its own mode by the PTTSW as described above.

In this manner, the handset user in FIG. 10 needs only to produce the necessary voice whenever he/she wants, so he/she does not have to manually operate any PTT switch or the like. That is to say, a high level, hands-free communications becomes feasible.

Also, the transmission part power source 20 can be controlled in a manner to be turned on only while the handset produces voice, so that the handset provides power savings.

More detailed operations of this embodiment in FIG. 10 will be described. The base unit stand-by mode (Reception mode) for the base unit in FIG. 9 occurs when the PPTSW 9 is Off. This causes switch 6 to connect to receiver 8, the switch 12 to be disconnected from transmitter 11, and switch 21 to switch to the reception part 150 (high frequency amplifier 2). The transmission part power source 20 is turned off and no radio waves are emitted.

In the handset stand-by mode (Reception mode) for the handset in FIG. 10, the voice detector 35 detects no voice and generates a stand-by signal to the transmitter/receiver switch controller 10. The switch 6 is connected to receiver 8, switch 12 is disconnected from transmitter 11, and switch 21 is switched to the reception part 150 (high frequency amplifier 2). The transmission part power source 20 is turned off and no radio waves are emitted.

In the base unit communication mode, the PPTSW 9 in FIG. 9 is on causing switch 6 to connect to receiver 8, switch 12 to connect to transmitter 11, and switch 21 to switch to transmission part 151 (transmission power amplifier 18). The transmission part power source 20 is turned on and radio waves are emitted.

In the handset communication mode, the voice detector 35 in FIG. 10 detects voice and then sends a communication signal to transmitter/receiver switch controller 10. The controller 10 causes switch 6 to disconnect from receiver 8, switch 12 to connect to transmitter 11, and switch 21 to switch to transmission part 151 (transmission power amplifier 18). The transmission part power source 20 is turned on and radio waves are emitted.

Figure 11:
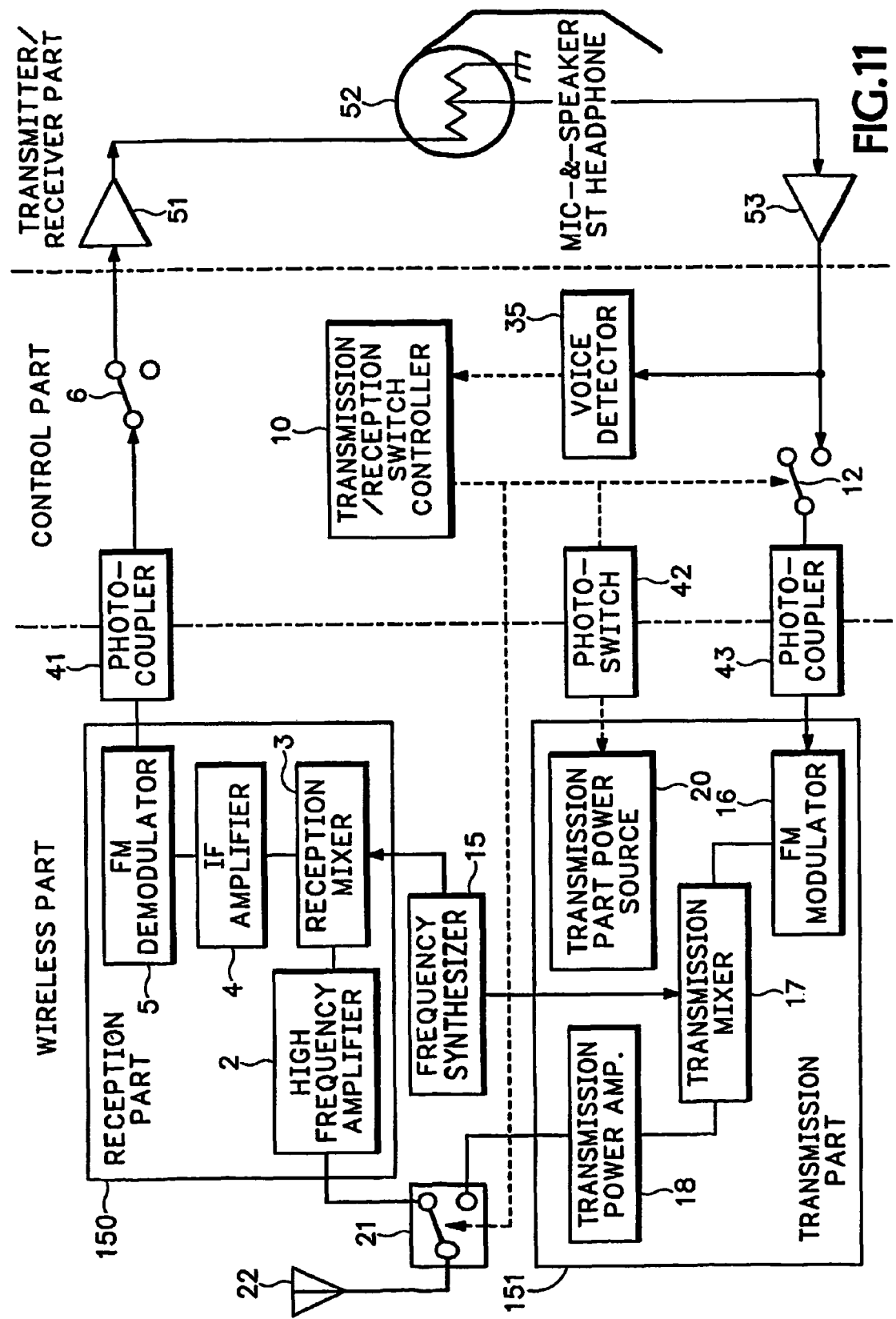
FIG. 11 shows another embodiment of a handset of a half-duplex, automatic-switching wireless communication device.

FIG. 11 is a circuit block diagram of the handset, showing a half-duplex, automatic-switching wireless communication device in another embodiment according to the present invention. In this case, FIG. 9 is used for the base unit.

A microphone-and-speaker headphone 52 is used in the transmitter/receiver part wherein the transmitter and a receiver are a microphone and a speaker. In one embodiment, the microphone and speaker are integrated into a single-transducer (ST) microphone-and-speaker ST headphone used both for transmission and reception. Amplifiers 51, 53 interface the ST with the outside (the control part and the wireless part).

According to FIG. 11, the transmitter/receiver part, at least the portion thereof including the ST, is shaped like an earphone, and inserted into an external ear canal of a user. Received voice is transmitted to the eardrum membrane of the user, while, user-generated voice is sensed in the form of vibration of the user's eardrum membrane, then transmitted to the outside as a transmission signal.

Outside noise can be prevented from superposing both on transmitted and received voices, so that received voice can be clearly heard while transmission voice can be clearly transmitted. Furthermore, the headset user can both his/her hands free, (periphery of) mouth free, and the other ear free. The user can use both hands and mouth for other activities, and can hear peripheral sound and voice through the ear that does not contain the earphone.

Photo-couplers 41, 43 are provided both in the reception path and in the transmission path, and a photo-switch 42 is provided in the control signal paths providing filtering between the power source 20 and the switch 21 and at the connection point of the control part and the wireless part.

In general, the transmitter of the transmitter/receiver part requires a highly sensitive, high gain amplifier 53 in order to amplify weak transmission signals. The single-transducer type sensor 52 requires a special class of highly sensitive, high gain amplifier with gain of about 55 dB, which means, it is very sensitive to noise. The above mentioned photo-couplers and photo-switch filter out the noise from the wireless part caused by the power source 20, so that the amplifier 53 can operate stably. The photo-couplers 41 and 43 and photo-switch 42 can be analog or digital. Noise in the voice output from a single-transducer type earphone 52 is reduced, which means less chance of the voice detector 35 selecting the wrong operation mode.

Figure 12:
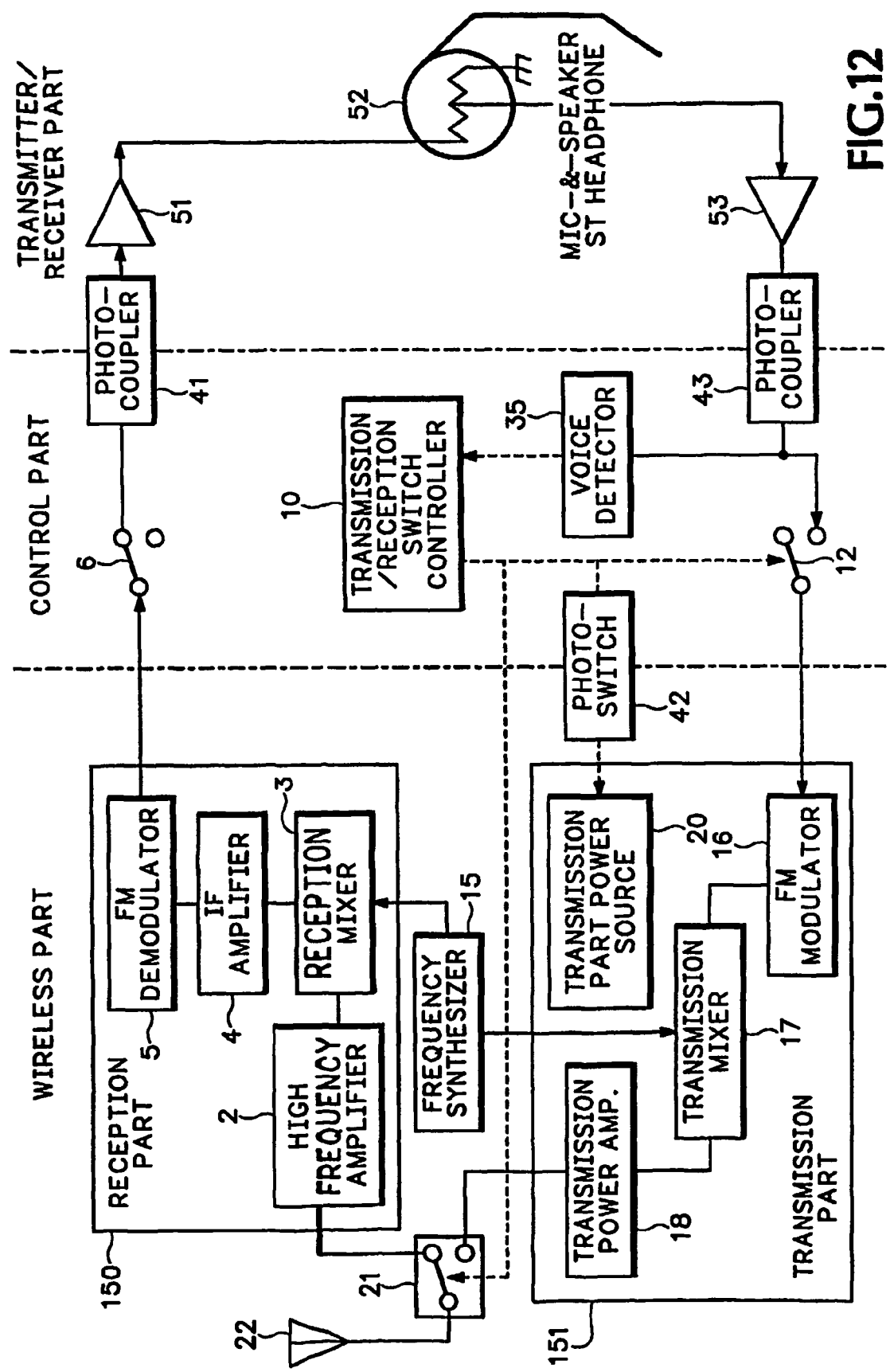
FIG. 12 shows another embodiment of a handset of a half-duplex, automatic-switching wireless communication device.

FIG. 12 is a circuit block diagram of a handset, showing a half-duplex, automatic-switching wireless communication device in another embodiment according to the present invention. In this case, FIG. 9 is used for the base unit. The photo-couplers 41, 43 are provided at the transmitter/receiver part side of the switches 6 and 12.

According to this embodiment, not only noise from the wireless part via the power source, but also noise from the control part via the power source can be shut down, so that the transmitter/receiver part, especially the highly sensitive, high gain amplifier 53 is operated more stably.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the appended claims

The invention claimed is:

1. A base station, comprising:
   a wireless part including a wireless transmitter and wireless receiver;
   a transmitter/receiver part including a receiver circuit for processing a wireless reception signal received by the wireless receiver and a transmitter circuit for processing a wireless transmission signal transmitted by the wireless transmitter; and
   a control part selectively connecting the wireless transmitter to the transmitter circuit and selectively connecting the wireless receiver to the receiver circuit according to a switched stand-by mode and communication mode,
   the control part further including a tone generator configured to generate and output an activation tone on the wireless transmission signal when the control part is switched from the stand-by mode to the communication mode, the activation tone automatically causing a handset receiving the transmission signal to switch from a reception mode where a handset receiver circuit is coupled to a handset wireless reception part and a handset transmitter is disconnected from a powered off wireless transmission part to a reception and transmission mode where the handset receiver circuit is coupled to the handset wireless reception part and the handset transmitter is connected to a powered on wireless transmission part.

2. The base station according to claim 1 wherein the control part outputs a first activation tone on the transmission signal for a predetermined time and at a first frequency after switching to the communication mode causing the handset to switch to the reception and transmission mode, the control part outputting a second tone on the transmission signal for a predetermined time at a second frequency different from the first frequency after switching back to the stand-by mode causing deactivation of the handset transmission mode.

3. The base station according to claim 1 wherein the control part includes a push-to-talk switch that upon being pressed automatically activates the tone generator and automatically activates a power source in the wireless transmitter.

4. A handset device, comprising:
transmitter circuitry for transmitting a wireless transmission signal;
receiver circuitry for receiving a wireless reception signal from a wirelessly transmitting base unit; and
control circuitry selectively switching the transmitter and receiver circuitry between a stand-by mode where only the receiver circuitry is operational to receive and demodulate the wireless reception signal from the base unit into audio signals and a communication mode where both the receiver circuitry and the transmitter circuitry are operational to receive and demodulate the wireless reception signal into audio signals and modulate and transmit audio signals as the wireless transmission signal, respectively, the control circuitry including a tone detector configured to monitor the wireless reception signal for a first activation frequency tone received from the transmitting base unit for remotely switching the control circuitry from the stand-by mode to the communication mode, the tone detector responsive to detecting the first activation frequency tone causing the control circuitry to switch from the stand-by mode to the communication mode.

5. The handset device according to claim 4 wherein the tone detector is further configured to monitor the reception signal for a second deactivation frequency tone received from the transmitting base unit for switching the control circuitry from the communication mode back to the stand-by mode, wherein the tone detector responsive to detecting the second deactivation frequency tone from the transmitting base unit causes the control circuitry to switch from the communication mode back to the stand-by mode.

6. The handset device according to claim 4 including a voice detector automatically causing the control circuitry to switch from the stand-by mode to the communication mode when a voice signal is received by the transmitter circuitry and automatically causing the control circuitry to switch back to the stand-by mode when no voice signal is received by the transmitter circuitry for a predetermined amount of time.

7. The handset device according to claim 4 including
a transmitter section;
a receiver section; and
a switch controller coupled to the tone detector, wherein the tone detector is configured to cause the switch controller to power on the transmitter circuitry and connect the transmitter circuitry to the transmitter section when operating in the communication mode and power off the transmitter circuitry and disconnect the transmitter circuitry from the transmitter section when operating in the stand-by mode.

8. The handset device according to claim 7 including a first noise filter coupled between the transducer and the transmitter circuitry and a second noise filter coupled between the transducer and the receiver circuitry.

9. The handset device according to claim 4 including a photo-switch coupled between the control circuitry and a power source activation signal in the transmitter circuitry.

10. The handset device according to claim 4 including an antenna switching circuit automatically connecting an antenna to the receiver circuitry during the stand-by mode and automatically connecting the antenna to the transmitter circuitry during the communication mode.

11. A half-duplex wireless communication device, comprising:
a wireless section including a wireless receiver for receiving a wireless reception signal and a wireless transmitter for transmitting a wireless transmission signal;
a transmitter/receiver section that includes a receiver section for outputting the reception signals as an audio output signal and a transmitter section for converting an audio input signal into the transmission signal supplied to the wireless transmitter; and
a control section switching between a stand-by mode where the wireless receiver is coupled to the receiver section and the wireless transmitter is powered off and disconnected from the transmitter section and a communication mode where the wireless receiver is coupled to the receiver section and the wireless transmitter is powered on and coupled to the transmitter section,
the control section including a transmission/reception switch controller and a voice detector coupled between the transmission/reception switch controller and the transmitter section together configured to automatically switching from the stand-by mode to the communication mode when a voice signal is detected in the transmission signal.

12. The communication device according to claim 11 wherein the control section automatically switches back to the stand-by mode when no voice signal is detected in the transmission signal for a predetermined period of time.

13. The communication device according to claim 11 wherein the control section automatically switches from the stand-by mode to the communication mode when a first predetermined frequency tone is detected in the reception signal.

14. The communication device according to claim 13 wherein the control section automatically switches from the communication mode back to the stand-by mode when a second predetermined frequency tone is detected in the reception signal.

15. The communication device according to claim 11 wherein the transmitter section and the receiver section comprise a single transducer configured into an ear piece for inserting into an external ear canal of an operator, a first amplifier coupled between the wireless receiver and a first the trans transducer and a second amplifier coupled between the wireless transmitter and the transducer.

16. The communication device according to claim 11 wherein the control section includes a first switch coupled between the wireless receiver and the receiver section, a second switch coupled between the wireless transmitter and the transmitter section, and a transmission/reception switch controller that shuts the first switch and opens the second switch during the stand-by mode and shuts both the first and second switch during the communication mode.

* * * * *